United States Patent [19]

Tabler

[11] 4,178,144
[45] Dec. 11, 1979

[54] MOLDING CONVEYOR DRIVE

[75] Inventor: Charles P. Tabler, Hamilton, Ohio

[73] Assignee: Kornylak Corporation, Hamilton, Ohio

[21] Appl. No.: 835,780

[22] Filed: Sep. 22, 1977

[51] Int. Cl.² .................. B29C 15/00; B29D 27/00
[52] U.S. Cl. .................... 425/150; 425/4 C; 425/372; 425/817 C; 264/46.2
[58] Field of Search ............ 425/372, 335, 817 R, 425/150, 4 C, 817 C; 264/51, 46.2

[56] References Cited

U.S. PATENT DOCUMENTS

| | | | |
|---|---|---|---|
| 2,326,889 | 8/1943 | Schulz et al. | 425/372 |
| 3,312,760 | 4/1967 | Berner | 425/329 X |
| 3,568,245 | 3/1971 | Jetzer | 425/372 X |
| 3,706,516 | 12/1972 | Kisteneich et al. | 425/4 C X |
| 3,887,314 | 6/1975 | Andresen et al. | 425/335 X |
| 3,994,648 | 11/1976 | Kornylak et al. | 425/150 |

*Primary Examiner*—Robert L. Spicer, Jr.
*Attorney, Agent, or Firm*—Thomas E. Beall, Jr.

[57] ABSTRACT

In a molding apparatus employing opposed endless belt conveyors to mold a non-rigid material into a rigid material, the problem of one conveyor being driven at a slightly greater speed than the other conveyor to produce harmful shear stresses within the molded product is avoided by driving both conveyors at generally the same speed during start-up until the rigid product extending between the two conveyors will tend to drive the slower conveyor at the speed of the faster conveyor, at which point the drive for the slower conveyor will be disconnected. One-way clutches may be placed in the drive of both conveyors so that it does not matter which conveyor is slower, or a one-way clutch may be placed in the drive of only one conveyor and the other conveyor constructed so that it will inherently tend to run faster than the one conveyor, or a selectively releasable coupling, such as a clutch, may be placed in the drive of one conveyor so that the drive of the one conveyor may be disconnected. Preferably, a synchronous motor is used to drive each of the conveyors from a common power source, so that the synchronous motor associated with the slower conveyor may be deenergized when the slower conveyor drive is uncoupled.

13 Claims, 2 Drawing Figures

MOLDING CONVEYOR DRIVE

BACKGROUND OF THE INVENTION

The present invention generally relates to the formation of a rigid product of indefinite length with endless belt conveyors, wherein a separate drive for each belt conveyor is necessary at least during start-up, and wherein after the rigid product extends between the conveyors, such rigid product is distorted due to inherent speed differentials between such conveyors.

A conveyor of this type is specifically illustrated in U.S. Pat. No. 3,994,648 to Andrew T. Kornylak and Charles P. Tabler, issued Nov. 30, 1976, the disclosure of which is incorporated herein for purposes of disclosing the basic molding environment, which is particularly related to the molding of rigid, foam, synthetic resin, such as polyurethane.

SUMMARY OF THE INVENTION

In a molding apparatus employing opposed endless belt conveyors to mold a non-rigid material into a rigid material, the problem of one conveyor being driven at a slightly greater speed than the other conveyor to produce harmful shear stresses within the molded product is avoided by driving both conveyors at generally the same speed during start-up until the rigid product extending between the two conveyors will tend to drive the slower conveyor at the speed of the faster conveyor, at which point the drive for the slower conveyor will be disconnected. One-way clutches may be placed in the drive of both conveyors so that it does not matter which conveyor is slower, or a one-way clutch may be placed in the drive of only one conveyor and the other conveyor constructed so that it will inherently tend to run faster than the one conveyor, or a selectively releasable coupling, such as a clutch, may be placed in the drive of one conveyor so that the drive of the one conveyor may be disconnected. Preferably, a synchronous motor is used to drive each of the conveyors from a common power source, so that the synchronous motor associated with the slower conveyor may be deenergized when the slower conveyor drive is uncoupled.

BRIEF DESCRIPTION OF THE DRAWING

Further objects, features and advantages of the present invention will become more clear from the following detailed description of a preferred embodiment of the present invention representing the best mode known at the present time, wherein in the drawing.

DETAILED DESCRIPTION

The present invention, for purposes of illustration, will be described with respect to the molding of synthetic resin, particularly rigid foamed polyurethane in indefinite length sheet form.

Figure 1:
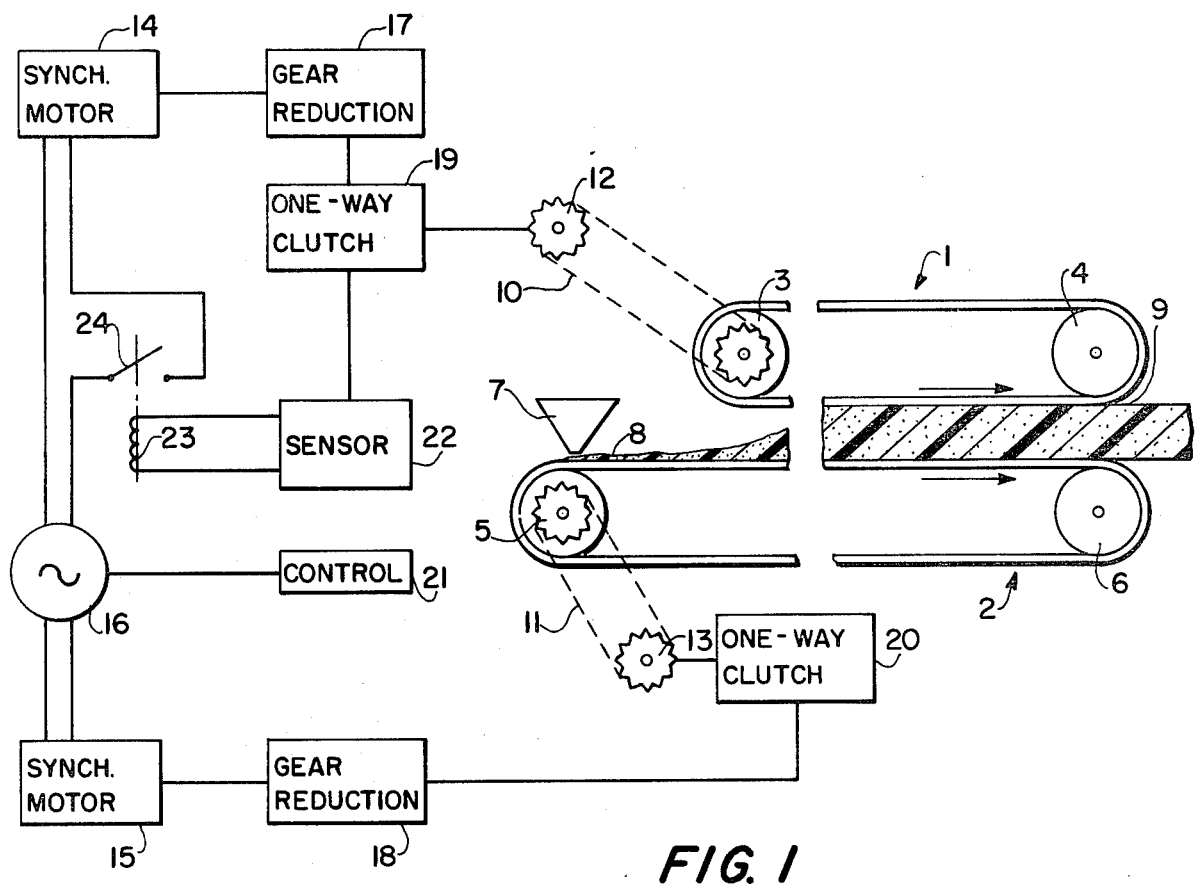
FIG. 1 is a side elevation view in schematic form of apparatus employing the present invention.

In the apparatus of FIG. 1, an upper endless conveyor employs a belt 1 that is guided around end sprockets 3 and 4, in combination with a lower endless conveyor having a belt 2 guided around end sprockets 5 and 6. As the belts are rotated in counterdirection so that their adjacent horizontally extending belt portions travel in the same direction as indicated by the arrows, the liquid foamable chemicals are deposited by a depositing apparatus 7 in a mass 8 on the lower conveyor belt 2. As the mass 8 moves to the right in FIG. 1, the chemicals foam as indicated to where they extend upwardly and in contact with the upper conveyor belt 1.

As is known, the foaming of polyurethane in such an apparatus will produce pressures in the neighborhood of 5 pounds per square inch on the belts 1 and 2, and the speed of the belts is coordinated with their length so that after full expansion, the resin is cured into a rigid sheet 9 that thereafter exits from the right hand portion of the two conveyors 1 and 2, where it may be cut to desirable lengths.

The above described apparatus of FIG. 1 is conventional and suffers from the problems that it is impossible within ordinary manufacturing tolerances to construct two conveyors of the size needed for such apparatus that can be driven at exactly the same speed so that there will be no difference in speed between the adjacent portions of belts 1 and 2. When it is realized that these conveyors are approximately 70 feet long in usual application, even a small difference in speed can produce a great misalignment between portions of conveyors 1 and 2 that are vertically aligned at the left hand portion of such conveyors by the time they reach the right hand portion of such conveyors. This shifting due to slight speed differences will tend to shear the rigid product and have an adverse affect upon the cell structure of the rigid foam. It is a purpose of the present invention to overcome such shearing within the rigid product and within the foam mass as it is being cured by eliminating the speed difference in the two conveyors that would otherwise normally occur while providing the necessary mechanical drives for each conveyor belt 1 and 2 required at least during start-up. As a part of the present invention, it is recognized that separate drives are needed only during start-up, and that after the conveyor has been in operation for a while, the rigid foam extending between the right hand portions of the conveyor belts 1 and 2 at the great pressures mentioned above will form a satisfactory driving connection between the two conveyors without adverse shearing effects within the rigid product.

According to a first embodiment of the present invention, each of the sprockets 3 and 5 is provided with a smaller drive sprocket connected with a chain 10, 11 that in turn is driven by a driving sprocket 12, 13, respectively. Synchronous motors 14, 15, which are driven from a central power source 16, respectively drive gear reduction units 17, 18 that in turn respectively drive the sprockets 12, 13 through one-way clutches 19, 20.

In operation, a control 21, which may be a simple manual start switch, will activate the central power source, which may be a suitable frequency generator to control the motor speed, so that the two synchronous motors 14 and 15 are driven at substantially the same speed. In this manner, the gear reduction units 17, 18, which are identical within manufacturing tolerances, will drive the sprockets 12 and 13 at substantially the same speed through the one-way clutches that will permit such driving. Within manufacturing tolerances, the synchronous motors 14, 15 are identical, the gear reduction units 17, 18 are identical, the sprocket and chain drives 3, 10, 12 and 5, 11, 13 are identical, and the size of the sprockets 3, 5 for the belts 1, 2 are identical so that the belts 1, 2 will be driven at substantially the same speed. However, due to the manufacturing tolerances of all of these items, even though they are as identical as standard items may be, there will be a difference in speed between the two conveyor belts 1 and 2, which will produce a substantial relative movement between the adjacent portions of the belts 1 and 2 over the considerable length of the molding apparatus during start-up when the foamable material 8 is first placed upon the lower belt 2 and thereafter continuously placed upon the lower belt 2. After the rigid foamed product 9 has been formed, the faster of the two belts 1 and 2 will tend to drive the slower of the two belts, regardless of which belt is in fact the faster of the two belts. By way of example, let it be assumed that the belt 2 is inherently faster than the belt 1 during start-up, and therefore after the rigid product 9 is formed, the belt 2 will tend to drive the belt 1 and when this happens, the belt 1 will tend to drive its synchronous motor 14, which is prevented by the one-way clutch 19 disengaging, which will leave the belt 1 free to pick up speed so it will be driven by the belt 2 at exactly the same speed as the belt 2 without shearing the product 9. Since the synchronous motor 14 is now not driving the belt 1 and therefore serves no purpose, it is desirable to deenergize the synchronous motor 14, and for this purpose, a sensor 22 preferably connected to the one-way clutch 19 senses such back driving explained above and operates a solenoid 23 that in turn opens a normally closed switch 24 to deenergize the synchronous motor 14.

If at some later time, due to wear, a change of operating characteristics of the synchronous motors 14, 15, or any other cause, the belt 1 becomes faster than the belt 2, an operation similar to that mentioned above would cause the one-way clutch 20 to disengage, and a sensor (not shown to avoid duplication) similar to sensor 22 could be employed to sense the disengagement of clutch 20 and through a solenoid (not shown) similar to solenoid 23 operate a switch (not shown) to deenergize the synchronous motor 15.

To avoid the necessity of providing a one-way clutch, sensor, solenoid, and switch in the drive of both the upper and lower conveyor, another embodiment of the present invention provides a small difference in the drives of the two conveyors so that one conveyor will inherently always drive faster than the other conveyor (before the formation of a rigid product 9). This is accomplished, for example, by providing one less tooth in the drive sprocket of sprocket 5 that engages the chain 11 as compared to the number of teeth in the drive sprocket of sprocket 3 engaging chain 10. Also, this could be accomplished within the gear reduction units themselves. In this manner, a one-way clutch, sensor, solenoid, switch would only need to be provided for the slower conveyor drive, which in this instance is the drive for the conveyor belt 1, and with respect to FIG. 1, the one-way clutch 20 would be unnecessary. The operation of such an embodiment would be the same as mentioned above with respect to the conveyor belt 1 travelling at a slower speed than the conveyor belt 2.

As a further embodiment, the one-way clutch 19 could be replaced with a selectively operable clutch (not shown) for each of the above two embodiments, so that after a predetermined start-up period (timed automatically or determined manually) sufficient to provide a rigid foamed product exiting from the right hand end of the conveyors, the selectively operable clutch could be actuated to disengage the drive for the conveyor belt 1, and if desired, such disengagement could be accomplished at the same time with actuation to open the switch 24 and deenergize the synchronous motor 14.

In all of the above embodiments, the sensor 22, solenoid 23 and switch 24 could be eliminated so that the synchronous motor 14 and gear reduction unit 17 would continue to rotate even after the one-way clutch 19 or the selectively operable clutch (not shown) of the third embodiment has disconnected such drive, because the drive provided by the synchronous motor 14 and gear reduction unit 17 would consume little power in its idling position.

It is preferable to have the one-way clutch between the gear reduction unit and the sprocket of the conveyor, for each conveyor, rather than between the synchronous motor and the gear reduction unit, because some gear reduction units cannot transmit power in both direction, that is they cannot be back driven, which is particularly true of a worm drive, and furthermore, even idling a gear reduction unit consumes a considerable amount of power so that it would be desirable to disconnect the gear reduction unit by both the one-way or selectively operable clutch and a switch 24.

Broadly, the illustrated one-way clutch and the mentioned selectively operable clutch are mechanical couplings that may be disconnected either automatically or manually, respectively. While a gear reduction unit has been illustrated schematically, and discussed in operation, any other type of mechanical speed reduction transmission may be employed such as chain and sprocket drives employing different size sprockets.

For purposes of illustration in FIG. 1, the one-way clutch and sensor means have been separated, but it is preferred that these two items are combined in a single unit, and further they may be incorporated within the drive shaft of the sprocket 3 after the chain 10, or by eliminating the chain 10.

Figure 2:
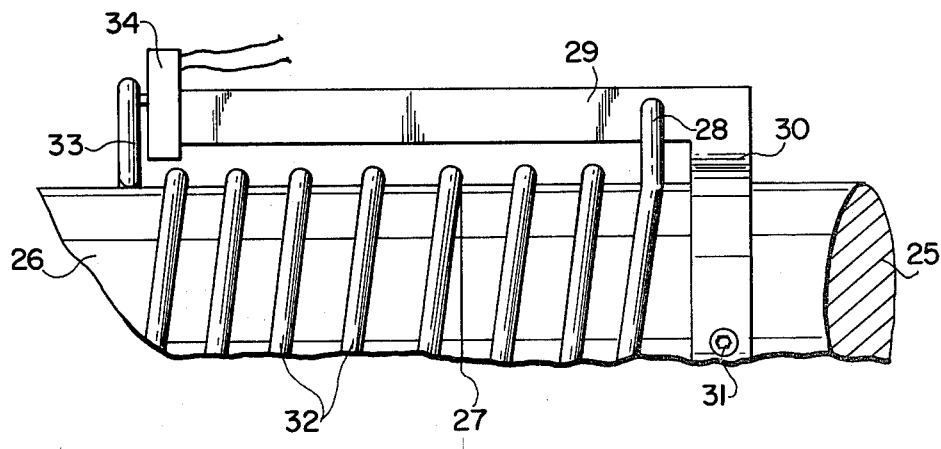
FIG. 2 is a partial enlarged view of a combined one-way clutch and drive sensor that may be employed in the apparatus of FIG. 1.

As an example of a specific one-way clutch and sensor, in FIG. 2, there is illustrated two aligned shafts 25, 26 that are closely adjacent to each other at their ends 27. One of these shafts 25, 26 may be rigidly connected to the drive wheel or sprocket 3 that directly engages the conveyor belt 1, while the other of the shafts 25, 26 is in direct driving engagement with the drive sprocket for the chain 10, or alternatively directly connected with the gear reduction unit 17 if the chain 10 were eliminated. The one-way clutch, by way of example, is constructed as a wrapping coil spring type of conventional clutch, having a fixed coil spring end 28 secured to the shaft 25 by means of welding the end 28 directly to the arm 29 of a collar 30 that surrounds the shaft 25 and is prevented from rotating with respect to the shaft 25 by means of a set screw 31. The coil spring clutch includes a helical coil having a plurality of turns 32 and an opposite end of the coil 33 that is free to move. In a known manner, the unstressed diameter of the helical coil is slightly smaller than the diameter of the shafts 25, 26.

In operation of the clutch shown in FIG. 2, let it be assumed that the shaft 25 is driven by the synchronous motor 14 and gear reduction unit 17 in the clockwise direction as viewed from the right hand end of the shaft 25 in FIG. 22; such rotation of shaft 25 will cause the coils 32 of the coil spring to wrap down tightly about both shafts 25 and 26 so as to drivingly connect the shafts 25 and 26 to drive the conveyor 1 by synchronous motor 14, which would occur during start-up of the molding apparatus. After the rigid product 9 is formed and assuming the conveyor 2 inherently drives at a speed greater than the conveyor 1, the conveyor 2 will start to drive the conveyor 1 through the rigid product 9, so that the shaft 26 that carries the sprocket positively interengaging with the conveyor belt 1 will start to drive the shaft 25, and the coils 32 of the spring will start to unwrap to permit the shaft 26 to turn at a speed greater than the shaft 25, in the same direction as the shaft 25, and in this manner, the one-way clutch will disconnect the shafts 25 and 26 so that the synchronous motor 14 no longer drives the conveyor belt 1, which is now being driven solely by the conveyor belt 2, which in turn is driven by the synchronous motor 15. When the coils 32 unwrap as mentioned above the disconnect the shafts 25 and 26, the coil end 33 will rotate relative to the coil end 28 a fixed amount, which relative rotation will actuate a switch 34 that is rigidly secured to the outer end of the arm 29, which switch 34 may in turn operate the solenoid 23 to disconnect the switch 24, so that the switch 34, arm 29, and collar 30 would constitute the sensor 22 of FIG. 1. Alternatively, the switch 34 could in fact replace the switch 24 shown in FIG. 1, so that the solenoid 23 would be unnecessary and the switch 34 would directly disconnect or deenergize the synchronous motor 14 whenever the one-way clutch operated to disconnect shafts 25 and 26 and permit shaft 26 to rotate at a speed faster than shaft 25. Other types of one-way clutches and sensors that are conventionally known may be employed instead of that shown in FIG. 2.

While a preferred embodiment of the present invention with various alternative embodiments and variations has been disclosed for purposes of disclosing the best mode and further the advantageous details, all for purposes of illustration, further embodiments, modifications and variations are contemplated according to the broader aspects of the present invention, all as determined by the spirit and scope of the following claims.

I claim:

1. Apparatus for molding non-rigid material into rigid indefinite length product employing a top endless molding belt conveyor and an opposed bottom endless molding belt conveyor, forming therebetween opposed endless molding surfaces, and means to drive both belts so that upon start-up when only non-rigid material is between the belts the belts may be driven at substantially the same speed, wherein the improvement is in means to prevent shearing forces from distorting the product through inherent small differences in conveyor speed, comprising: mechanical coupling means between said drive means and only one of said conveyors for normally transferring driving power from said drive means to said one conveyor only; and means for disconnecting said mechanical coupling means when the other of said conveyors is being driven at a speed greater than said one conveyor so that said other conveyor may drive said one conveyor through the rigid product at a common speed.

2. The apparatus of claim 1, including selectively operable means for disconnecting said mechanical coupling means of said one conveyor without disconnecting the drive to said other conveyor, so that said other conveyor may drive said one conveyor through the rigid product at a common speed.

3. The apparatus of claim 1, wherein said mechanical coupling means is a one-way clutch drivingly connected between said drive means and said one conveyor so as to transmit power only from said drive means to said one conveyor so that said one conveyor may be driven faster than said drive means by said other conveyor transmitting power through the rigid product to said one conveyor.

4. The apparatus of claim 3, further including one-way clutch means between said drive means and said other conveyor to disconnect said other conveyor whenever said other conveyor is driven by said one conveyor through the rigid product at a greater speed than it would be driven by said drive means.

5. The apparatus of claim 3, wherein said drive means drives said other conveyor at a speed greater than said one conveyor when said other conveyor cannot drive said one conveyor at its speed before the product becomes rigid during start-up.

6. The apparatus of claim 5, further including transducer means for sensing when said other conveyor drives said one conveyor through the rigid product to produce a disconnect signal; said drive means including a separate electric motor for driving respectively each of said conveyors; and disconnect means associated with said transducer means for turning off the electric motor associated with said one conveyor upon receipt of said disconnect signal from said transducer means.

7. The apparatus of claim 6, wherein each of said motors is a synchronous motor, and said drive means further comprises a common electrical energizing source for said motors.

8. The apparatus of claim 3, wherein said drive means includes electric motor means providing a substantially common drive speed for each of said conveyors and a separate mechanical speed reduction transmission between said electric motor means and each of said conveyors, with said transmission of said one conveyor having a greater speed reduction than the transmission of said other conveyor.

9. The apparatus of claim 8, further including transducer means for sensing when said other conveyor drives said one conveyor through the rigid product to produce a disconnect signal; and electric motor means including a separate electric motor for driving respectively each of said conveyors; and disconnect means associated with said transducer means for deenergizing the electric motor associated with said one conveyor upon receipt of said disconnect signal from said transducer means without deenergizing the electric motor associated with said other conveyor.

10. The apparatus of claim 9, wherein each of said electric motors is a synchronous motor, and said drive means further comprises a common electrical energizing source for said motors.

11. A method of molding a non-rigid material into a rigid indefinite length product between a top endless molding belt conveyor and an opposed bottom endless molding belt conveyor, which together form therebetween opposed endless molding surfaces, and driving both of the belt conveyors during start-up when only non-rigid material is between the belts so that the belts may be driven at substantially the same speed at least until the produce becomes rigid between the conveyors, wherein the improvement is to prevent shearing forces from distorting the rigid product through inherent small differences in conveyor speeds, comprising the further steps of: mechanically coupling a drive separately to each of the conveyors so that they may be each separately driven at substantially the same speed; and disconnecting the mechanical coupling for the one conveyor when the one conveyor is being driven by the other conveyor through the rigid product so that it may drive at a speed exactly equal to the other conveyor.

12. The method of claim 11, further including the steps of driving the other conveyor at a greater speed than the one conveyor whenever there is no rigid driving connection through the product between the conveyors.

13. The method of claim 12, further including the step of driving each of said conveyors with a separate motor; and electrically deenergizing only the electric motor driving the one conveyor when the mechanical coupling is disconnected.

* * * * *